(12) United States Patent
Weinzierl

(10) Patent No.: US 7,104,352 B2
(45) Date of Patent: *Sep. 12, 2006

(54) INTERCOOLER SYSTEM AND METHOD FOR A SNOWMOBILE WITH A SUPERCHARGED ENGINE

(75) Inventor: Steven M. Weinzierl, Baldwin, WI (US)

(73) Assignee: Polaris Industries, Inc., Medina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/715,296

(22) Filed: Nov. 17, 2003

(65) Prior Publication Data

US 2004/0238252 A1 Dec. 2, 2004

Related U.S. Application Data

(63) Continuation of application No. 10/136,113, filed on May 2, 2002, now Pat. No. 6,651,765.

(51) Int. Cl.
*B60K 11/00* (2006.01)

(52) U.S. Cl. .................. 180/190; 180/9.1; 60/599; 60/605.1

(58) Field of Classification Search ........ 180/190–192, 180/9.1, 9.21, 9.25; 60/599, 604, 605.1; 123/563

See application file for complete search history.

(56) References Cited

U.S. PATENT DOCUMENTS

| | | | |
|---|---|---|---|
| 4,008,777 A | 2/1977 | Juto et al. | |
| 4,249,626 A | 2/1981 | Fields et al. | |
| 4,317,439 A * | 3/1982 | Emmerling | 123/563 |
| 4,337,733 A | 7/1982 | Hirata et al. | |
| 4,340,123 A | 7/1982 | Fujikawa | |
| 4,546,742 A * | 10/1985 | Sturges | 123/41.05 |
| 4,660,532 A * | 4/1987 | Tholen | 123/563 |
| 5,129,473 A | 7/1992 | Boyer | |
| 5,152,255 A * | 10/1992 | Fukuda | 123/41.33 |
| 5,167,294 A | 12/1992 | Gessinger | |
| 5,232,066 A | 8/1993 | Schnelker | |
| 5,316,079 A * | 5/1994 | Hedeen | 165/140 |
| 5,394,854 A * | 3/1995 | Edmaier et al. | 123/563 |
| 5,568,840 A | 10/1996 | Nagata et al. | |
| 5,950,432 A | 9/1999 | Zimmer et al. | |
| 5,957,230 A | 9/1999 | Harano et al. | |
| 6,006,540 A | 12/1999 | Coletti | |
| 6,021,764 A | 2/2000 | Hoyama | |
| 6,109,217 A | 8/2000 | Hedlund et al. | |
| 6,561,297 B1 | 5/2003 | Yatagai et al. | |
| 6,748,934 B1 * | 6/2004 | Natkin et al. | 123/563 |
| 2001/0044244 A1 | 11/2001 | Tscherne et al. | |
| 2002/0027029 A1 | 3/2002 | Yatagai et al. | |

* cited by examiner

Primary Examiner—Lesley D. Morris
Assistant Examiner—Lee Lum
(74) *Attorney, Agent, or Firm*—Patterson, Thuente, Skaar & Christensen

(57) ABSTRACT

A snowmobile (20) having an engine (34) with an air charging system (70). The air charging system (70) is connected to an intercooler assembly (57), which includes a heat exchanger (56) mounted adjacent to an intercooler opening (48) in the track tunnel (36). A snow retention area (54) is located above the heat exchanger (56) allowing for snow/ice to be thrown from a snowmobile drive track (38) and build up on top of the heat exchanger (56), allowing the snow/ice to absorb heat from intercooler assembly (57).

11 Claims, 3 Drawing Sheets

INTERCOOLER SYSTEM AND METHOD FOR A SNOWMOBILE WITH A SUPERCHARGED ENGINE

CROSS REFERENCE TO RELATED APPLICATIONS

This patent application claims the benefit of U.S. patent application Ser. No. 10/136,113, filed May 2, 2002 now U.S. Pat. No. 6,651,765, which is incorporated herein by reference.

BACKGROUND OF INVENTION

The present invention relates to snowmobiles, and more particularly to snowmobiles with engines having air chargers such as exhaust-driven (turbo) or mechanical superchargers.

Conventionally, snowmobiles have been made small and light weight, yet have relatively powerful engines in order to appeal to the typical snowmobile driver. Because of the small size, the packaging of the components in a snowmobile is critical. However, due to its sporting nature, it is also desirable to have a snowmobile that is powered by an engine that is not only efficient and light weight, but also generates significant power for its size. So, traditionally, two cycle engines have been used to power snowmobiles. These engines have the advantage that they are powerful, yet relatively light weight and compact. One particular disadvantage to the two cycle engine is its emissions—it generally exhausts more hydrocarbons and other pollutants than an equivalent four cycle engine due to cylinder charging inefficiencies and the combustion of lubricating oil, among other things. Also, the two cycle engine tends to operate at a relatively high noise level. With concern for the environment and increasing strict emissions requirements being instituted by governments, it is increasingly desirable to use four cycle engines with snowmobiles.

But a naturally aspirated four cycle engine generally produces less specific output per liter of engine displacement than does a two cycle engine. It is not practical to merely increase the engine size due to the size and weight limitations present in packaging an engine in a snowmobile. Furthermore, the typical transmission employed in a snowmobile limits the upper end of the RPM range for the engine. To increase the output of a particular four cycle engine, then, one may wish to employ an air charging system, such as a turbocharger (exhaust driven compressor) or a supercharger (mechanically driven compressor). However, a conventional air charger will require the use of a higher grade of gasoline in order to avoid detonation and pre-ignition problems (i.e. engine knock), which can over time significantly reduce the useful life of an engine. This higher grade of gasoline is not always available to a snowmobile driver along the various trails that he may travel.

Thus, it is desirable to have a snowmobile that is powered by a four cycle engine which overcomes the drawbacks of limited engine output, while still remaining relatively small and light weight. In particular, it is desirable to have an air charging system that maximizes the engine output while not requiring a premium grade of gasoline.

SUMMARY OF INVENTION

In its embodiments, the present invention contemplates a snowmobile. The snowmobile has a chassis that includes a track tunnel portion having a front end, with the front end of the tunnel portion including an intercooler opening, and a wall located adjacent to the front end of the track tunnel and the intercooler opening defining a snow/ice retention area. A track is located within the tunnel portion, and an engine, having an air intake assembly, an air charging system and an exhaust assembly, is mounted to the chassis. The snowmobile also has an intercooler system including a heat exchanger being disposed adjacent to the intercooler opening and the wall, with the heat exchanger including a charge air inlet and a charge air outlet, and with the charge air inlet being in fluid communication with the air charging system and the charge air outlet being in fluid communication with the air intake assembly; and a screen covering the intercooler opening.

The present invention further contemplates a method of operating a snowmobile engine having an air charging assembly and an air intake assembly, the method comprising the steps of: compressing intake air in the air charging assembly; locating snow/ice on a first heat exchanger by providing a snow/ice retention area adjacent to the heat exchanger, and causing snow/ice to be propelled into the snow/ice retention area; passing an intercooler liquid through the first heat exchanger to thereby transfer heat to the snow/ice; passing the intercooler liquid through a second heat exchanger; passing the compressed intake air through the second heat exchanger to thereby transfer heat to the intercooler liquid; directing the compressed intake air into the air intake assembly; monitoring operating conditions of the engine; and injecting the intercooler liquid into the air intake assembly under a predetermined set of the operating conditions.

In its embodiments, the present invention also contemplates a method of operating a snowmobile engine having an air charging assembly, an engine air intake assembly, the method comprising the steps of: compressing intake air in the air charging assembly; providing a snow/ice retention area adjacent to a heat exchanger; causing snow/ice to be propelled into the snow/ice retention area; passing ram air through the heat exchanger and the snow/ice; passing the compressed intake air through the heat exchanger to thereby transfer heat to the snow/ice; and directing the compressed intake air into the air intake assembly.

An advantage of an embodiment of the present invention is that a four stroke engine may be employed with a snowmobile, producing sufficient engine output, while remaining relatively small and light weight.

Another advantage of an embodiment of the present invention is that the charged air engine in the snowmobile need not require a premium grade of gasoline to operate properly.

A further advantage of an embodiment of the present invention is that the intercooler heat exchanger, by employing snow/ice to cool the charge air, is very efficient, allowing it to be relatively small and light weight. This efficiency also allows for minimum pressure loss in the charge air as it is being cooled in the heat exchanger, thus allowing for a relatively smaller size turbine in the air charger assembly while still providing sufficient pressure in the engine air intake. This allows for easier packaging of the components as well as reduced cost.

An added advantage of an embodiment of the present invention is that the engine cold start capability is improved since the engine will operate at higher compression ratios than would otherwise be possible with regular grade gasoline.

Another advantage of an embodiment of the present invention is that there is minimal turbo lag in the system since the total air volume in the engine system is kept to a minimum.

A further advantage of an embodiment of the present invention is that the intercooler system for the air charger is effective even during operation of the snowmobile under high engine load, low forward speed conditions, such as when climbing a hill.

An additional advantage of an embodiment of the present invention is that a portion of the intercooler liquid can be injected into the charge air, thus removing additional heat from the air charge.

DETAILED DESCRIPTION

Figure 1:
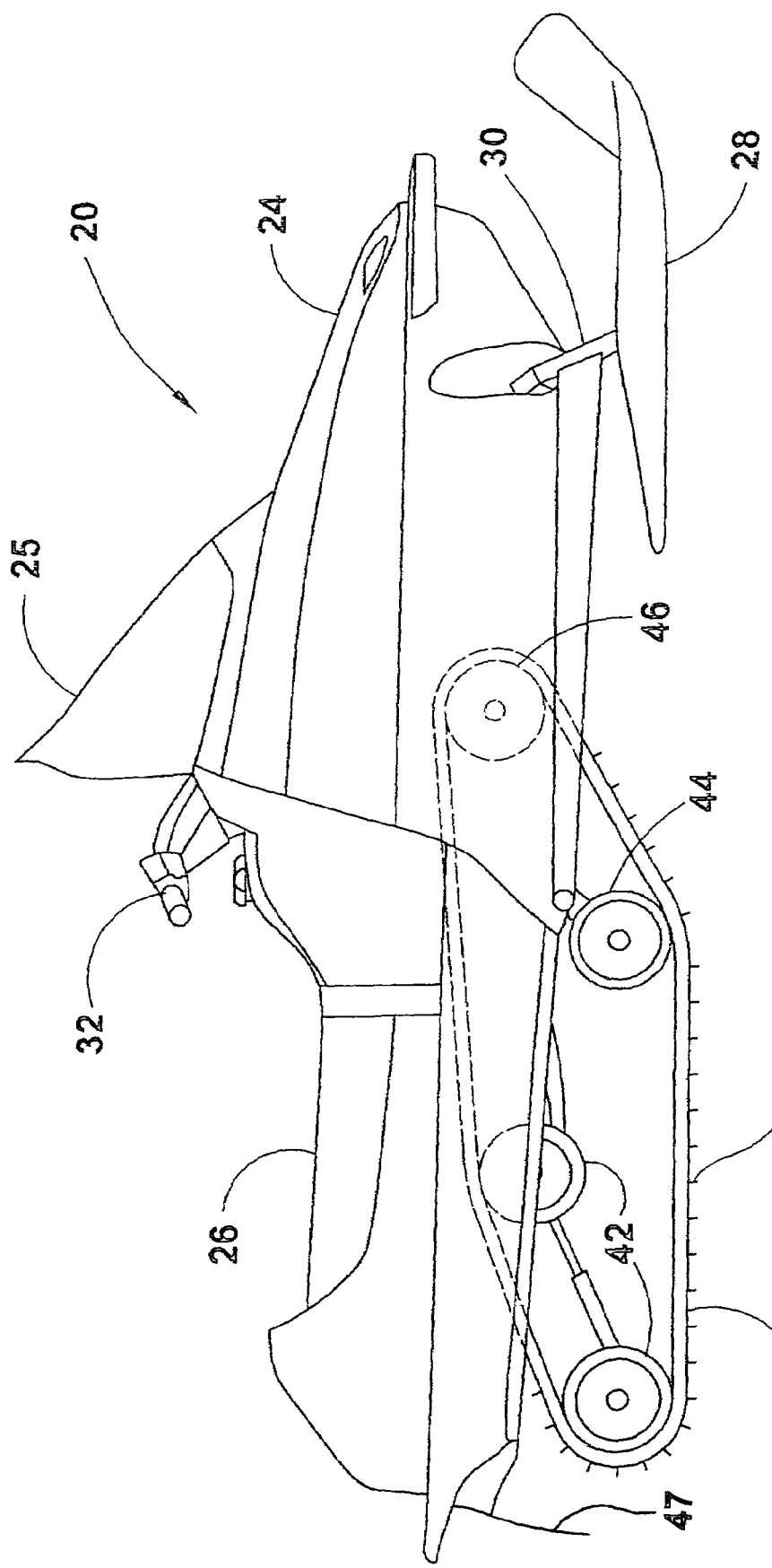
FIG. 1 is a schematic side view of a snowmobile in accordance with the present invention.
Figure 2:
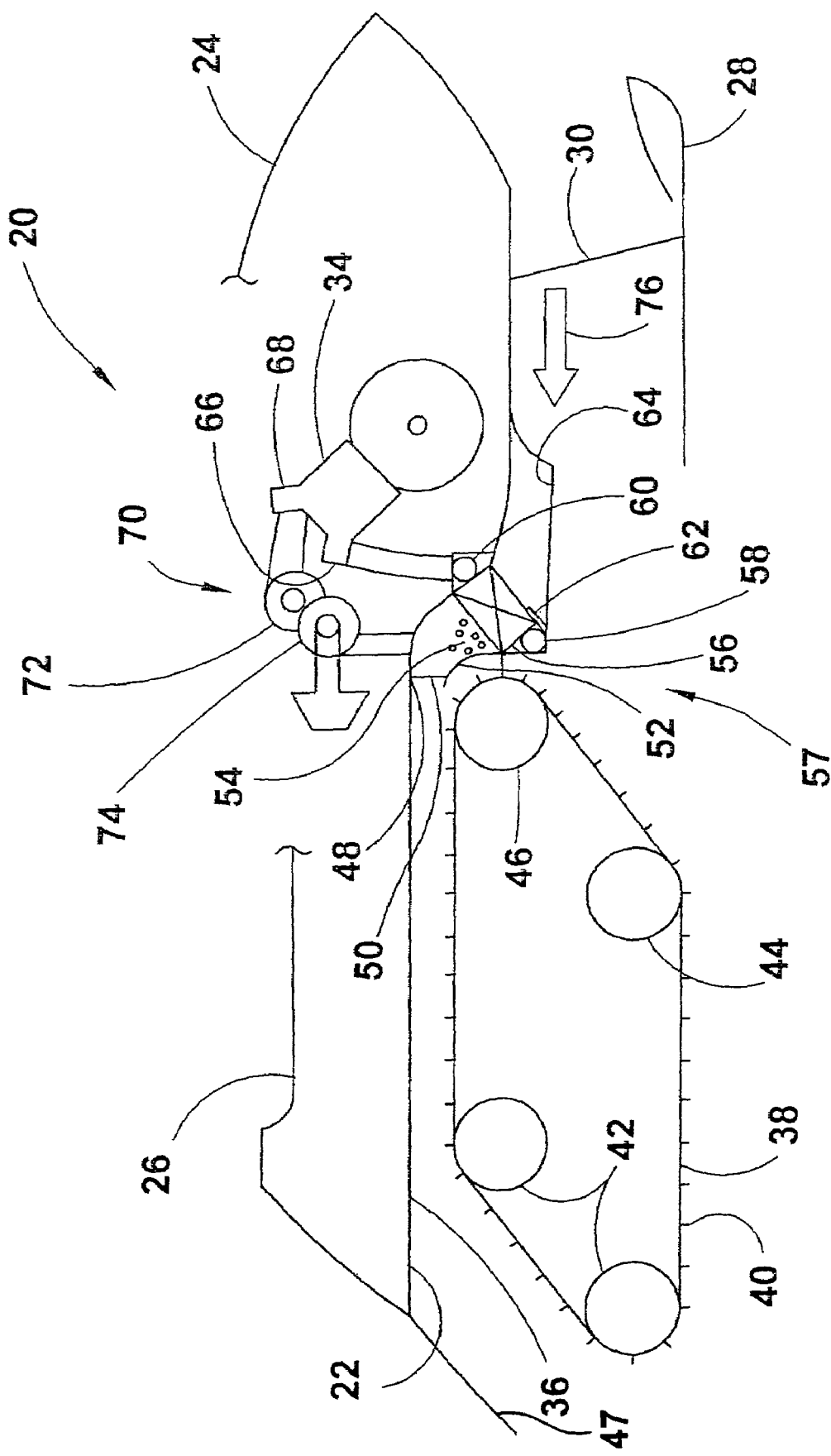
FIG. 2 is a schematic view of the snowmobile, including the engine and air charging system of the present invention.

FIGS. 1–2 illustrate a snowmobile 20, which includes a chassis 22 upon which is mounted a hood 24 and a seat 26, with a windshield 25 between them. A pair of front skis 28 (only one shown) are each connected to the chassis 22 via a front suspension 30 and are connected to a steering assembly 32. An engine 34 is mounted to the chassis under the hood 24. A rear portion of the chassis 22 forms a track tunnel 36, which is generally located under the seat 26.

Within the track tunnel 36 is mounted a drive track 38. The drive track 38 is a loop of rubber (or other suitable) material and includes paddle-like cleats 40. The drive track 38 is generally supported by a pair of rear idler wheels 42, a front lower idler wheel 44 and a front drive wheel or sprocket 46. Since the invention does not deal with the details of the suspension system for the front skis 28 or the drive track 38, where any details of these suspension systems are discussed or shown, any conventional structure may be utilized as may be readily apparent to those skilled in the art. Preferably, there is a rubberized snow flap 47, which is mounted behind the drive track 38 in order to allow more snow/ice to be entrained in the tunnel 36 and moved toward an intercooler opening 48.

The track tunnel 36 includes the intercooler opening 48, at the front of the tunnel 36 and facing backwards toward the front of the drive track 38. There is preferably a screen 50 covering the opening 48 in order to keep unwanted debris from entering the opening 48. The chassis 22 includes a lower wall portion 52 just forward of the opening 48, forming a snow retention area 54. The size of the opening 48, and the height of the wall 52 can be sized, as desired, to trap the appropriate amount of snow/ice in the retention area 54. Preferably, the opening should be designed to prevent bridging, which can prevent the continued introduction of snow/ice to a heat exchanger 56.

Located just forward of the opening 48, and forming a bottom portion of the retention area 54 is the tunnel heat exchanger 56—this forms part of an intercooler system 57. The heat exchanger 56 includes cooling fins, upon which snow/ice held in the retention area 54 falls. The tunnel heat exchanger 56 is mounted to the chassis 22, which are both usually made of aluminum. The heat exchanger 56 includes an air inlet 58 and an air outlet 60. The heat exchanger 56 can be, for example, a plate-and-shell or an extruded-tube heat exchanger. The later is preferred, and, since, as will be discussed below, the heat transfer is very efficient, the passage size of its extruded tubes can be relatively large, thus minimizing the pressure loss in the charge air as it passes through the tubes, from the inlet 58 to the outlet 60. There is a flap 62, located on the forward underside of the heat exchanger 56.

The chassis 22 also includes a ram air duct 64 located forward of the heat exchanger 56. It has an opening facing forward and extends rearwardly to the heat exchanger 56, creating a path for air to flow to the heat exchanger 56.

The engine 34 has an air intake manifold 66, which is connected to the outlet 60 of the tunnel heat exchanger 56, and an exhaust manifold 68, which is connected to a turbine 72 in an air charging assembly 70. The air charging assembly 70 also includes a compressor 74, which is connected to the air inlet 58 of the heat exchanger 56. The air charging assembly 70 illustrates a turbocharger, but as would be clear to one skilled in the art, a supercharger assembly may be employed instead. The engine 34 will include some type of engine cooling system (not shown), which may employ, for example, air cooling or liquid cooling—but this system does not form part of the present invention, and can be conventional in nature, so it will not be discussed further herein.

In this embodiment, the tunnel heat exchanger 56 acts as the primary intercooler element for cooling the charge air. One will note that the heat exchanger 56 location is ideal since it is adjacent to the track 38 at a very good location for receiving snow/ice, and is also located close to the engine 34, thus minimizing the volume of air in the system. Otherwise, the turbo-lag could increase dramatically.

The operation of the snowmobile 20 will now be described. When the engine 34 is started, the exhaust from the engine 34 will drive the air charging assembly 70, causing intake air to be compressed and pushing the charged air through the heat exchanger 56 and into the engine intake manifold 66. As the snowmobile 20 moves forward, some of the snow/ice caught in the grooves of the track 38 or on the track cleats 40 is inertially separated and thrown off as that particular portion of the track 56 engages the front drive wheel 46. This is due to the abrupt change in track direction at that location. The snow/ice is thrown toward the intercooler opening 48 because the opening 48 is intentionally located in the path of this snow/ice. So this snow/ice is propelled through the opening 48 and comes to rest in the retention area 54 on top of the heat exchanger 56.

When referring to snow/ice herein, this generally means water in its solid state, but it may also include some liquid water or water vapor, as the case may be, since it may be partially melted when initially entering the intercooler system, and of course will melt when absorbing heat from the charged air. Thus, the term snow/ice means water mostly in its solid state, but also includes some liquid water and some water vapor.

The heat exchanger 56 is oriented to allow for a fall through (or drain through) type of flow. This means that, as the charge air flowing through the heat exchanger 56 gives off heat to the snow/ice resting on top, the snow/ice melts. The liquid water will flow down through the heat exchanger 56, via the normal action of gravity, and continue to absorb heat until it falls out the bottom the heat exchanger 56 or vaporizes. The ram air duct 64 allows air, indicated generally as 76 in FIG. 2, to flow through the duct 64 and then through the heat exchanger 56. This ram air duct 64 is optional, but will help to enhance evaporative cooling and keep the snow/ice piled on top of the heat exchanger 56 moving. In the alternative, a moving blade (not shown) can be employed to keep the snow/ice in the retention area 54 moving and break it up. The flap 62, which is optional, is mounted against the heat exchanger 56, and will retain some of the melted snow/ice that has melted and dropped through the tunnel heat exchanger. This water will then boil off as it absorbs additional heat.

Since the heat exchanger 56 is directly mounted to the chassis 22, and both are preferably made of aluminum, which is a good heat transfer material, the chassis 22 will also absorb some of the heat from the heat exchanger core 56, further improving the overall efficiency of the system.

When the intake air is compressed, by the air charging system 70, its temperature increases. But, since hot air contains less energy-providing oxygen by volume than cooler air, it will produce less power. A cooler charge of air is denser and can be mixed with more fuel to increase engine output. Additionally, cooler charge air reduces the tendency for engine detonation (spontaneous combustion). Thus, an effective intercooler can greatly improve the engine output.

The efficiency of the intercooler is obtained due in part to the fact that water, when changing phase from a solid to a liquid or a vapor can absorb a very large amount of heat—significantly more heat than just air or water at ambient temperature. The high heat transfer rate means that the heat exchanger core size can be minimized, while the charge air temperature is lowered substantially—even below ambient air temperature under certain conditions. With the very efficient cooling, the tubes through which the charge air flows can be made less restrictive, thus minimizing the pressure drop across the heater core. By minimizing the pressure loss, the charge air density is improved. Further, by significantly cooling the charge air, this allows for an increase in intake manifold pressure without serious pre-detonation (i.e. engine knock) concerns, which allows one to obtain even higher performance levels from the engine.

In the first embodiment, the tunnel heat exchanger 56 is a charge air-to-snow/ice heat exchanger, which acts directly as the charge air intercooler. Other intercooler system configurations are possible where the tunnel heat exchanger 56 does not directly cool the charge air, as will be discussed in more detail below in regard to FIG. 3.

Figure 3:
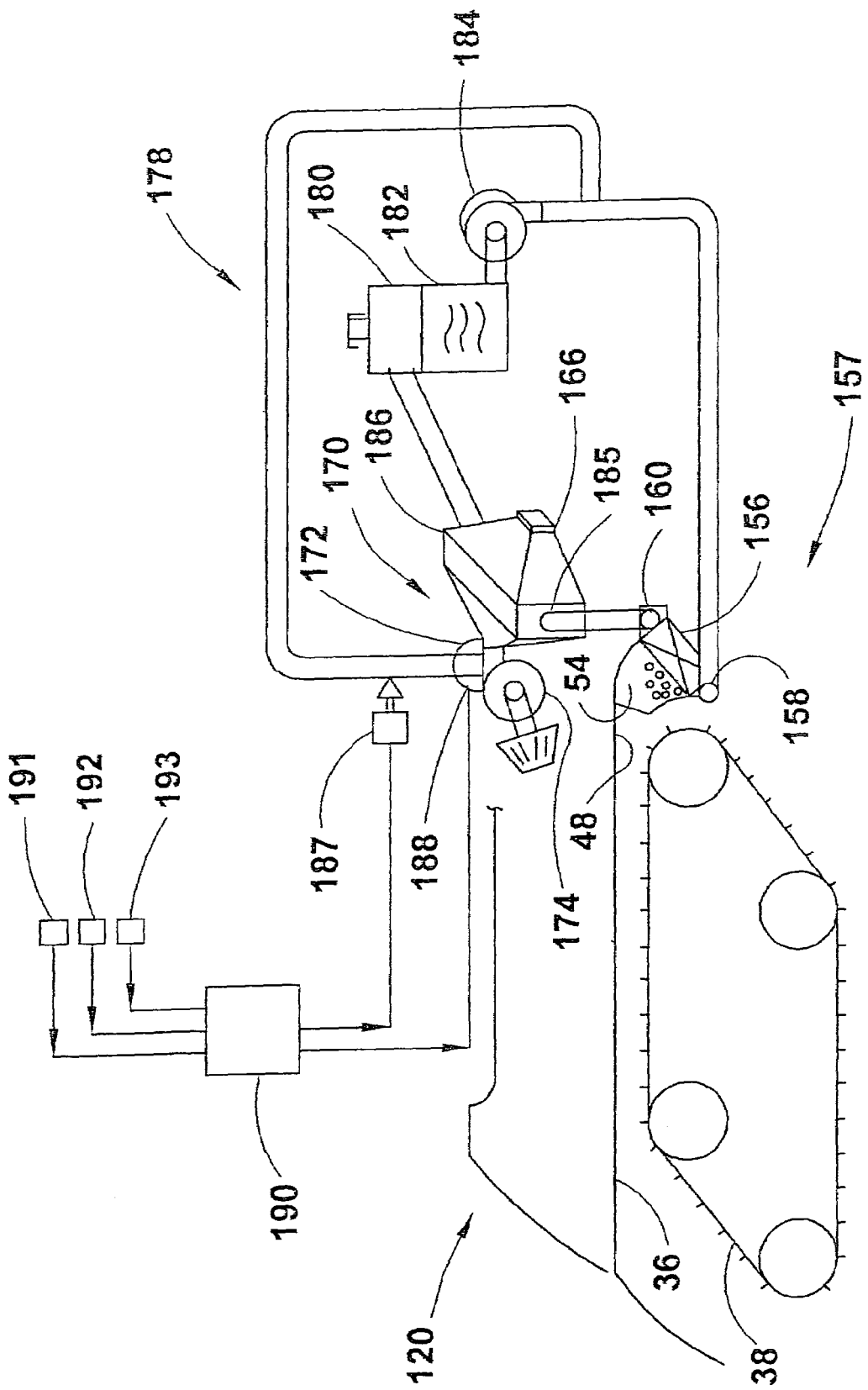
FIG. 3 is a view similar to FIG. 2, but illustrating an alternate embodiment of the present invention.

FIG. 3 illustrates a second embodiment of the snowmobile 120 of the present invention. In this embodiment, elements that are the same as in the first embodiment will be designated with the same element numbers, but those that have changed or been added will be designated with 100 series numbers.

In this embodiment, the charge air is not directly cooled by the tunnel heat exchanger 156. A secondary loop, an intercooler liquid loop 178, is added to improve the cooling performance of the intercooler system 157 under certain operating conditions. This intercooler liquid loop 178 includes a liquid container 180, which holds intercooler liquid 182. The intercooler liquid 182 is preferably an inexpensive, easily obtainable fluid, such as, for example, windshield washer fluid used with automotive vehicles. Although, if one prefers, other suitable liquids may be employed. The container 180 is connected to a pump 184, which, in turn, is in fluid communication with the inlet 158 to the tunnel heat exchanger 156. The outlet 160 to the tunnel heat exchanger 156 is in fluid communication with an inlet 185 to a charge air-to-liquid heat exchanger 186, which, in turn, is in fluid communication with the liquid container 180.

The pump 184 is also in fluid communication with the charge air output of the air charging assembly 170, via an injector valve 187. The intercooler liquid 182 can be injected into the charge air in order to control engine knock under certain engine operating conditions.

The tunnel heat exchanger 156 is again mounted below a snow retention area 54 in front of an intercooling opening 48, which is again at the front of the track tunnel 36 in front of the track 38. But, in this second embodiment, the tunnel heat exchanger 156 is a liquid-to-snow/ice heat exchanger, and acts as a secondary intercooler element, with the charge air-to-liquid heat exchanger 186 being the primary intercooler element. Thus, the tunnel heat exchanger 156 employs the snow/ice to cool the liquid 182, which, in turn, is employed to cool the charge air.

The compressor 174 of the air charging assembly 170 is connected to an air inlet of the heat exchanger 186, and an outlet of the heat exchanger 186 is connected to the engine intake manifold 166. A wastegate 188 couples to the turbine 172 to allow for exhaust bypass of the turbine 172 if the pressure of the charge air is too high. The wastegate 188 and the injector valve 187 are controlled by an engine control unit 190, based upon inputs from an intercooler liquid level sensor 191, a charge air temperature sensor 192, and a knock sensor 193, in addition to other conventional inputs to the engine control unit 190.

While the intercooler system 157 of the second embodiment is more complicated than that in the first embodiment, it provides advantages that allow for further enhancements to performance. Under limited engine operating conditions, such as for transient operation, when engine knock is more difficult to control, as is indicated by the knock sensor 193 detecting engine knock, some of the intercooler liquid 182 can be metered into the intake manifold 166 in order to control the knock. If the level sensor 191 indicates that the liquid level is not sufficient to meter some into the intake, then the engine control unit 190 can limit some other engine function in order to prevent knock, instead of metering the liquid 182 into the air intake. Further, the thermal mass of the intercooler liquid 182 can be used to lower the charge air temperature under transient operation because the thermal mass can prevent a rapid rise of charge temperature.

While certain embodiments of the present invention have been described in detail, those familiar with the art to which this invention relates will recognize various alternative designs and embodiments for practicing the invention as defined by the following claims.

What is claimed is:

1. A method of operating a snowmobile engine having an air charging assembly, an engine air intake assembly, the method comprising the steps of:
   compressing intake air in the air charging assembly;
   providing a snow/ice retention area adjacent to a heat exchanger;
   causing snow/ice to be propelled into the snow/ice retention area;
   passing ram air through the heat exchanger and the snow/ice;
   passing the compressed intake air through the heat exchanger to thereby transfer heat to the snow/ice; and
   directing the compressed intake air into the air intake assembly.

2. The method of claim 1 further including the steps of: melting the snow/ice into liquid water; and blocking a portion of the heat exchanger to prevent flow of the liquid water out of the heat exchanger, thereby causing the liquid water to vaporize.

3. A method of operating a snowmobile engine having an air charging assembly and an air intake assembly, the method comprising the steps of:
- compressing intake air in the air charging assembly;
- locating snow/ice on a first heat exchanger by providing a snow/ice retention area adjacent to the heat exchanger, and causing snow/ice to be propelled into the snow/ice retention area;
- passing an intercooler liquid through the lint heat exchanger to thereby transfer heat to the snow/ice;
- passing the intercooler liquid through a second heat exchanger;
- passing the compressed intake air through the second heat exchanger to thereby transfer heat to the intercooler liquid;
- directing the compressed intake air into the air intake assembly;
- monitoring operating conditions of the engine; and
- injecting the intercooler liquid into the air intake assembly under a predetermined set of the operating conditions.

4. The method of claim 3 further including the step of passing ram air through the heat exchanger and the snow/ice.

5. The method of claim 3 wherein the step of monitoring the operating conditions of the engine includes the steps of: monitoring the amount of intercooler liquid, measuring the temperature of the compressed intake air in the air intake assembly, and detecting if an engine knock is occurring in the engine.

6. A snowmobile comprising:
- a chassis that includes a track tunnel portion having a front end, with the front end of the tunnel portion including an intercooler opening, and a wall located adjacent to the front end of the track tunnel and the intercooler opening defining a snow/ice retention area;
- a track located within the tunnel portion;
- an engine mounted to the chassis, and including an air intake assembly and an exhaust assembly;
- an air charging system;
- an intercooler system including a heat exchanger being disposed adjacent to the intercooler opening and the wall, with the heat exchanger including a charge air inlet and a charge air outlet, and with the charge air inlet being in fluid communication with the air charging system and the charge air outlet being in fluid communication with the air intake assembly; and
- a screen covering the intercooler opening.

7. The snowmobile of claim 6 wherein the air charging system includes a turbocharger, with the turbocharger having a turbine in fluid communication wit the exhaust assembly and a compressor adapted to be in fluid communication with intake air.

8. The snowmobile of claim 6 wherein the heat exchanger has a lower portion, and wherein the heat exchanger further includes a flap sealingly mounted to the lower portion.

9. The snowmobile of claim 6 further including a ram air duct having a first end adapted to be open to air around the snowmobile and a second end adjacent to the heat exchanger.

10. An air charging system for use with a snowmobile engine, the snowmobile engine being mounted for propelling a snowmobile over a snow/ice covered terrain, comprising:
- a first heat exchanger for cooling an air charge, an efficiency of the first heat exchanger being enhanced by the first heat exchanger being so disposed such that the first heat exchanger cools the air charge by means of latent heat including at least the heat of fusion required to melt a mass of snow/ice that is in thermal communication with the first heat exchanger; and
- a second heat exchanger operating in cooperation with the first heat exchanger to cool the air charge, the second heat exchanger including a liquid reservoir for holding a volume of liquid, the reservoir being in fluid communication with the second beat exchanger for convectively cooling the air charge in the second heat exchanger, the second heat exchanger having a liquid reservoir, the liquid reservoir being in fluid communication with the snowmobile engine for delivery of a quantity of liquid thereto for mixing with a fuel/air charge responsive to a sensed condition of detonation in the snowmobile engine.

11. A method of cooling an air charge in an air charging system, the air charging system being for use with a snowmobile engine, the snowmobile engine being mounted for propelling a snowmobile over a snow/ice covered terrain, comprising:
- flowing a heated air charge through a first heat exchanger;
- melting a mass of snow/ice that is in thermal communication with the first heat exchanger,
- operating a second heat exchanger in cooperation with the first heat exchanger to cool the air charge, including the second heat exchanger having a liquid reservoir for holding a volume of liquid, fluidly communicating the reservoir with the second heat exchanger for convectively cooling the air charge in the second heat exchanger,
- enhancing an efficiency of the first heat exchanger by so disposing the first heat exchanger such that the first heat exchanger cools the air charge by means of latent heat including at least the heat of fusion of the melting mass of snow/ice; and
- fluid communicating the liquid reservoir of the second heat exchanger with the snowmobile engine and delivering of a quantity of liquid thereto for mixing with a fuel/air charge responsive to a sensed condition of detonation in the snowmobile engine.

* * * * *

UNITED STATES PATENT AND TRADEMARK OFFICE
CERTIFICATE OF CORRECTION

PATENT NO.         : 7,104,352 B2
APPLICATION NO. : 10/715296
DATED              : September 12, 2006
INVENTOR(S)        : Steven M. Weinzierl It is certified that error appears in the above-identified patent and that said Letters Patent is hereby corrected as shown below:

In Column 7, Line 9, delete the word "lint" and insert --first--.

In Column 7, Line 49, delete the word "wit" and insert --with--.

In Column 8, Line 20, delete the word "beat" and insert --heat--.

Signed and Sealed this

Fifth Day of December, 2006

JON W. DUDAS
*Director of the United States Patent and Trademark Office*